(12) United States Patent
Van Huis et al.

(10) Patent No.: US 8,925,891 B2
(45) Date of Patent: Jan. 6, 2015

(54) REVERSE DETACH MOUNTING SYSTEM

(75) Inventors: Christopher J. Van Huis, West Olive, MI (US); Peter T. Kantola, Ravenna, MI (US); Ulrich A. Kuester, Spring Lake, MI (US); Danny L. Minikey, Jr., Fenwick, MI (US)

(73) Assignee: Gentex Corporation, Zeeland, MI (US)

( * ) Notice: Subject to any disclaimer, the term of this patent is extended or adjusted under 35 U.S.C. 154(b) by 260 days.

(21) Appl. No.: 13/431,657

(22) Filed: Mar. 27, 2012

(65) Prior Publication Data

US 2013/0062497 A1 Mar. 14, 2013

Related U.S. Application Data

(60) Provisional application No. 61/534,512, filed on Sep. 14, 2011.

(51) Int. Cl.
| *A47F 7/14* | (2006.01) |
| *A47G 1/16* | (2006.01) |
| *B60R 1/04* | (2006.01) |
| *B60R 11/04* | (2006.01) |
| *B60R 11/00* | (2006.01) |

(52) U.S. Cl.
CPC . *B60R 1/04* (2013.01); *B60R 11/04* (2013.01); *B60R 2011/0026* (2013.01)
USPC ......... 248/475.1; 248/549; 248/479; 248/548

(58) Field of Classification Search
None
See application file for complete search history.

(56) References Cited

U.S. PATENT DOCUMENTS

| 5,100,095 | A | * | 3/1992 | Haan et al. .................... 248/549 |
| 5,377,948 | A | * | 1/1995 | Suman et al. ................. 248/549 |
| 5,820,097 | A | * | 10/1998 | Spooner ........................ 248/549 |
| 5,931,440 | A | * | 8/1999 | Miller ........................... 248/549 |
| 6,447,127 | B1 | * | 9/2002 | Yoshida et al. ................ 359/871 |
| 6,483,438 | B2 | * | 11/2002 | DeLine et al. ............. 340/815.4 |
| 7,717,394 | B2 | * | 5/2010 | Tanaka et al. ................. 248/549 |
| 7,726,623 | B2 | * | 6/2010 | Muller ....................... 248/475.1 |
| 8,134,117 | B2 | * | 3/2012 | Heslin et al. .................. 250/239 |
| 2008/0315060 | A1 | * | 12/2008 | Muller ....................... 248/475.1 |
| 2011/0168866 | A9 | * | 7/2011 | Gruener et al. ............ 248/475.1 |

FOREIGN PATENT DOCUMENTS

EP 0169734 1/1986

OTHER PUBLICATIONS

Patent Cooperation Treaty, International Searching Authority, International Search Report, Written Opinion of the International Searching Authority and Notification of Transmittal, Sep. 5, 2012, 6 Pages.

* cited by examiner

*Primary Examiner* — Nkeisha Smith
(74) *Attorney, Agent, or Firm* — Price Heneveld LLP; Scott P. Ryan

(57) ABSTRACT

A rearview device mounting assembly configured for use with a vehicle including a bracket having a windshield engagement surface, a mount abutment surface, an internal clip engagement wall, and an external peripheral wall. A spring clip is coupled with a rearview device mount and includes a plurality of legs adapted for engagement with the internal clip engagement wall.

25 Claims, 12 Drawing Sheets

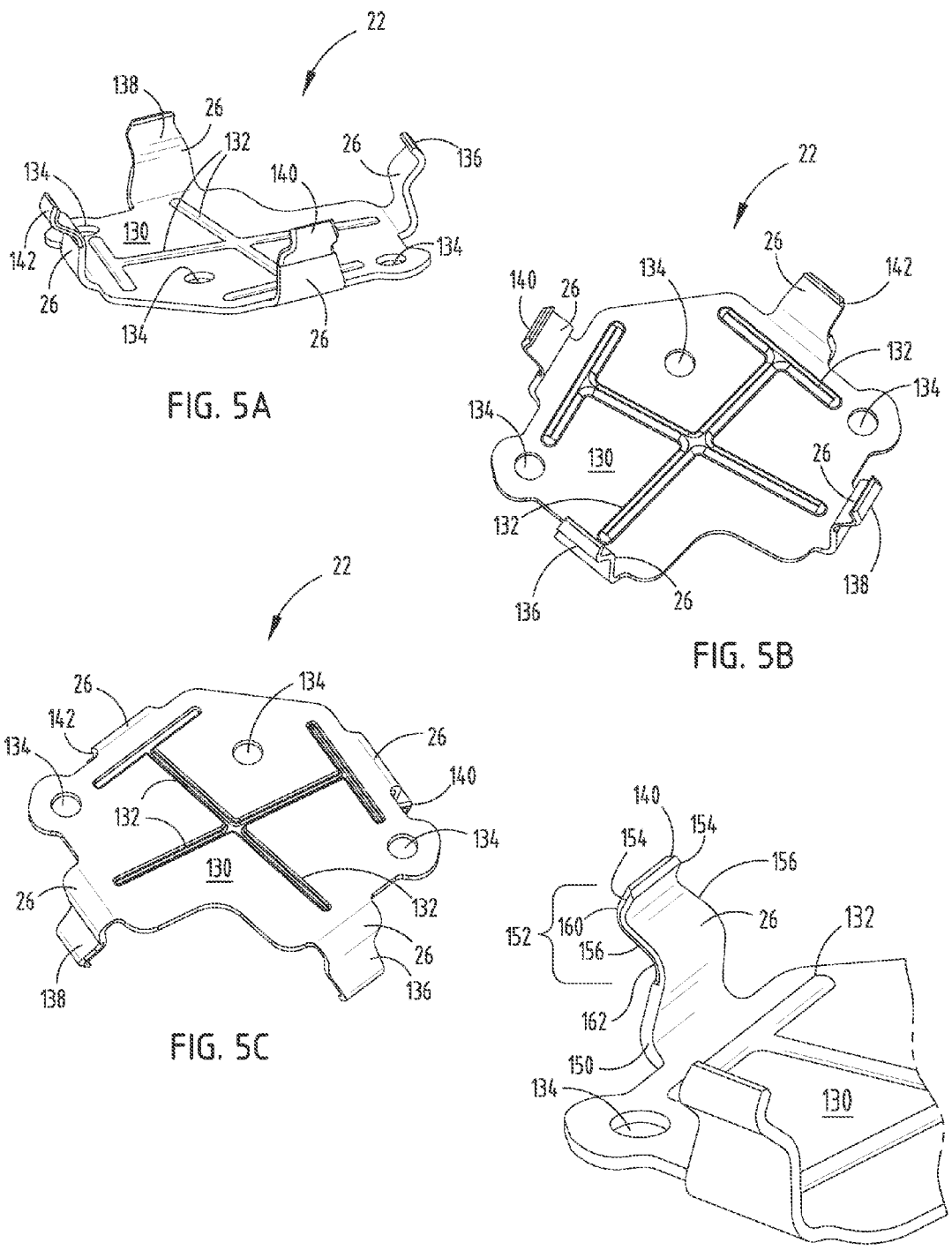

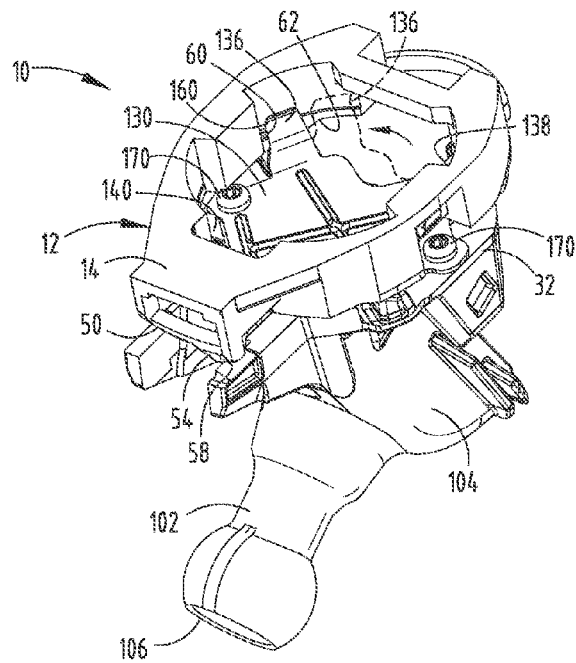
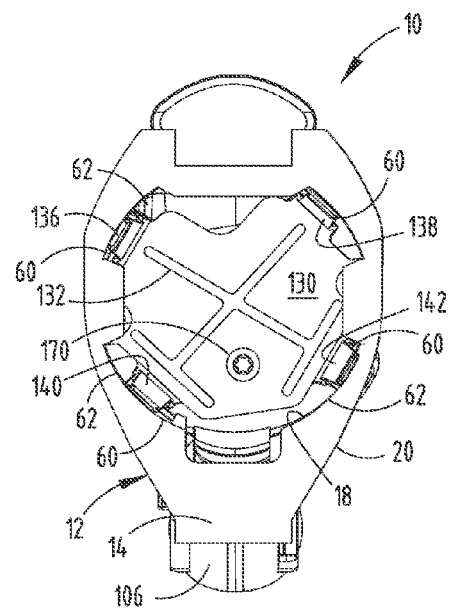
FIG. 7A
FIG. 7B
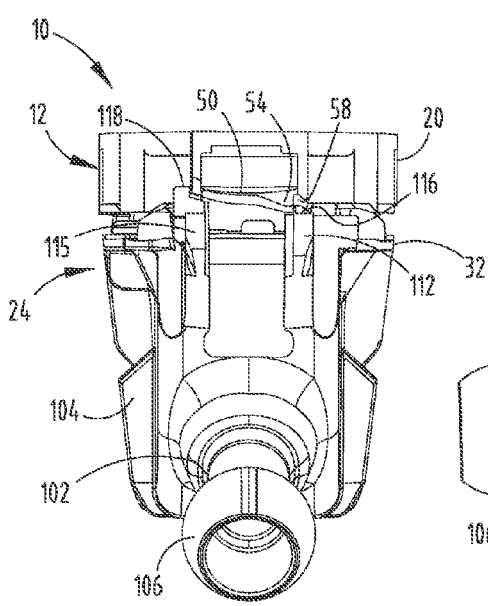
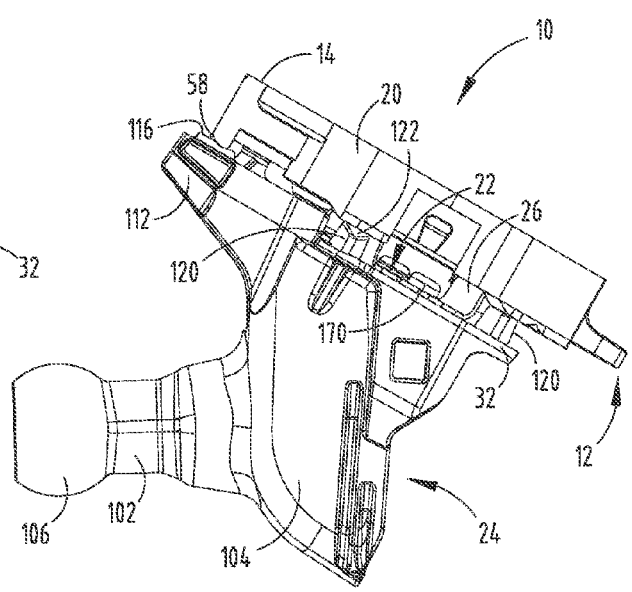
FIG. 7C
FIG. 7D

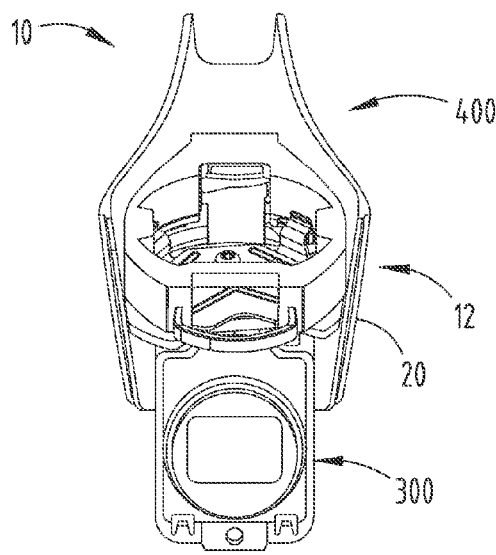
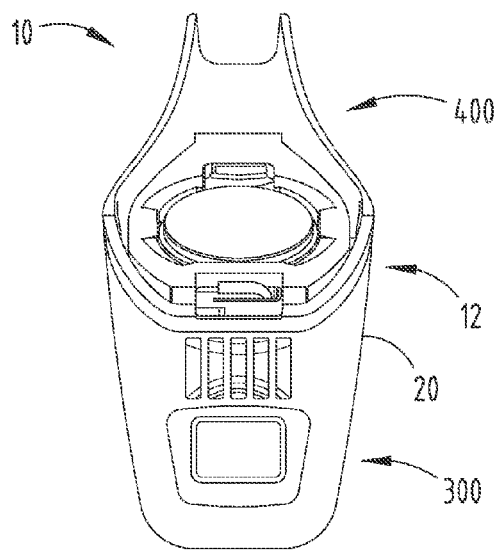
FIG. 10A    FIG. 10B
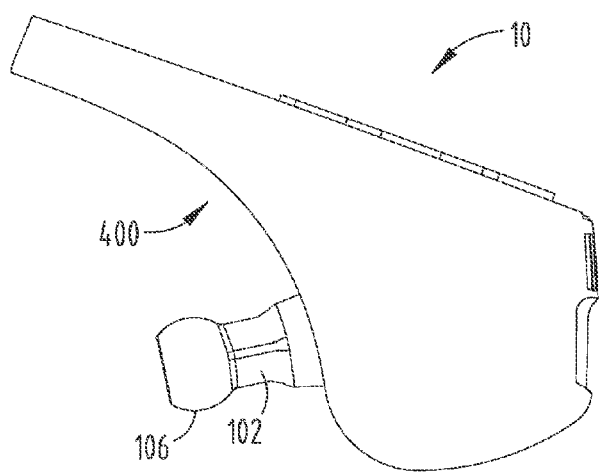
FIG. 10C

REVERSE DETACH MOUNTING SYSTEM

CROSS-REFERENCE TO RELATED APPLICATIONS

This application claims the benefit of and priority to U.S. Provisional Patent Application No. 61/534,512, filed on Sep. 14, 2011, entitled "REVERSE DETACH MOUNTING SYSTEM," the disclosure of which is hereby incorporated herein by reference in its entirety.

BACKGROUND OF THE INVENTION

The invention generally relates to vehicle rearview device assembly. More particularly, the present invention relates to a mounting system for mounting an interior rearview device assembly to a bracket on the interior of a vehicle windshield.

SUMMARY OF THE PRESENT INVENTION

One aspect of the present invention includes a rearview device mounting assembly configured for use with a vehicle having a bracket including a windshield engagement surface, a mount abutment surface, an internal clip engagement wall, and an external peripheral wall. A spring clip is coupled with a rearview device mount and includes a plurality of legs adapted for engagement with the internal clip engagement wall.

Another aspect of the present invention includes a rearview device mounting assembly for a vehicle having a device housing. A mount is pivotally coupled with the device housing. A spring clip is coupled with the mount and includes a plurality of legs configured to engage a bracket. The bracket includes an internal clip engagement wall. The plurality of legs couple the bracket to the mount.

Yet another aspect of the present invention includes a rearview device mounting assembly having a device housing pivotally coupled with a mount. A spring clip is coupled with the mount and includes a plurality of legs. A bracket includes an internal clip engagement wall and a plurality of retention surfaces configured to engage the plurality of legs, thereby coupling the bracket to the mount.

Another aspect of the present invention includes a rearview device mounting assembly for a vehicle that includes a rearview device housing and a bracket having an internal clip engagement wall. A spring clip is coupled with the rearview device housing and includes a plurality of legs that apply an outward radial force on the internal clip engagement wall of the bracket to secure the rearview device housing to the bracket.

Still another aspect of the present invention includes a rearview device mounting assembly having a spring clip adapted to engage an internal clip engagement wall of a bracket. The rearview device mounting assembly also includes an engagement area on a peripheral external wall. The spring clip includes a plurality of legs that secure the rearview device mount to a bracket positioned on a windshield of a vehicle.

These and other aspects, objects, and features of the present invention will be understood and appreciated by those skilled in the art upon studying the following specification, claims, and appended drawings.

BRIEF DESCRIPTION OF THE DRAWINGS

FIG. 5A is a top perspective view of one embodiment of a spring clip of the present invention;

FIG. 5B is a top perspective view of the spring clip of FIG. 5A;

FIG. 5C is a bottom perspective view of the spring clip of FIG. 5A;

FIG. 5D is an enlarged top perspective view of a leg of the spring clip of FIG. 5A;

FIG. 7A is a top perspective view of one embodiment of a spring clip during engagement with one embodiment of a bracket of the present invention;

FIG. 7B is a top plan view of the spring clip and bracket of FIG. 7A;

FIG. 7C is a front elevational view of the bracket and spring clip of FIG. 7A;

FIG. 7D is a side elevational view of the bracket and spring clip of FIG. 7A;

FIG. 9A is a top perspective view of a rearview device mounting assembly of the present invention during a collision event;

FIG. 9B is an enlarged view of the stop groove of the bracket of FIG. 9A;

FIG. 9C is a side elevational cross-sectional view illustrating a leg of the spring clip disengaging a retention surface of the bracket during a collision event;

FIG. 10A is a rear elevational view illustrating a camera device housing operably connected with the bracket;

FIG. 10B is a rear elevational view of a shroud connected with one embodiment of a bracket of the present invention;

FIG. 10C is a side elevational view of the shroud and rearview device mounting assembly of FIG. 10B;

DETAILED DESCRIPTION OF EMBODIMENTS

Figure 1A:
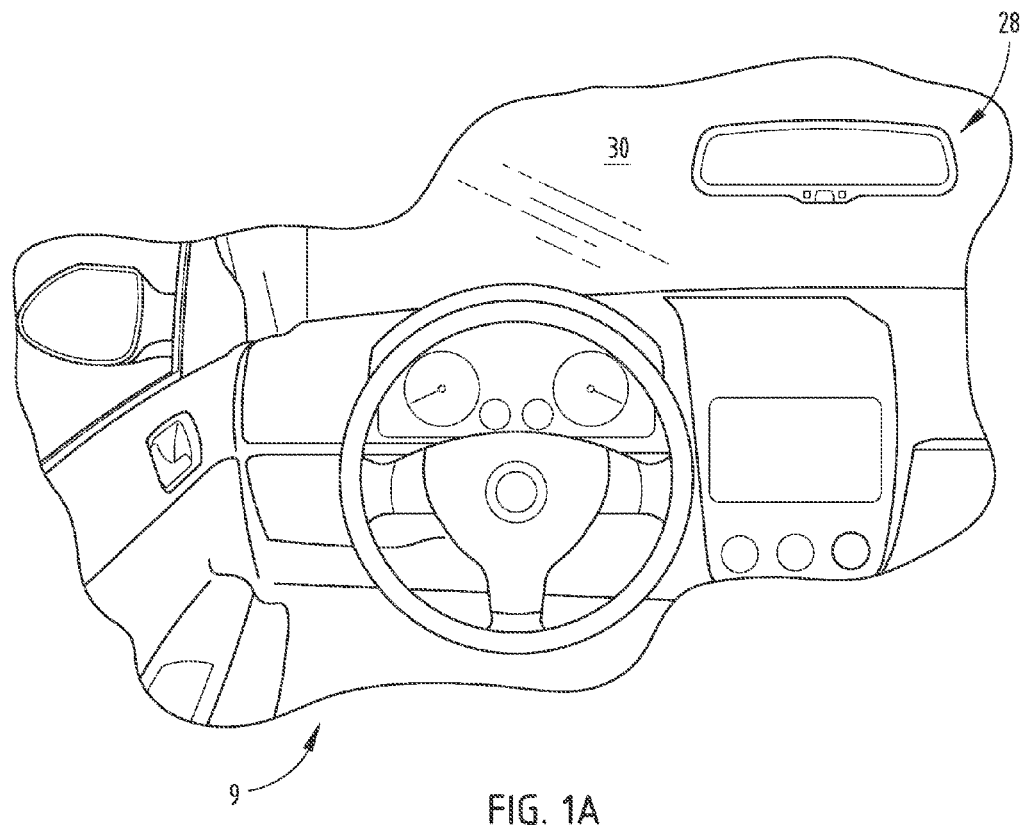
FIG. 1A is a front elevational view of a rearview device connected with a windshield of a vehicle.
Figure 1B:
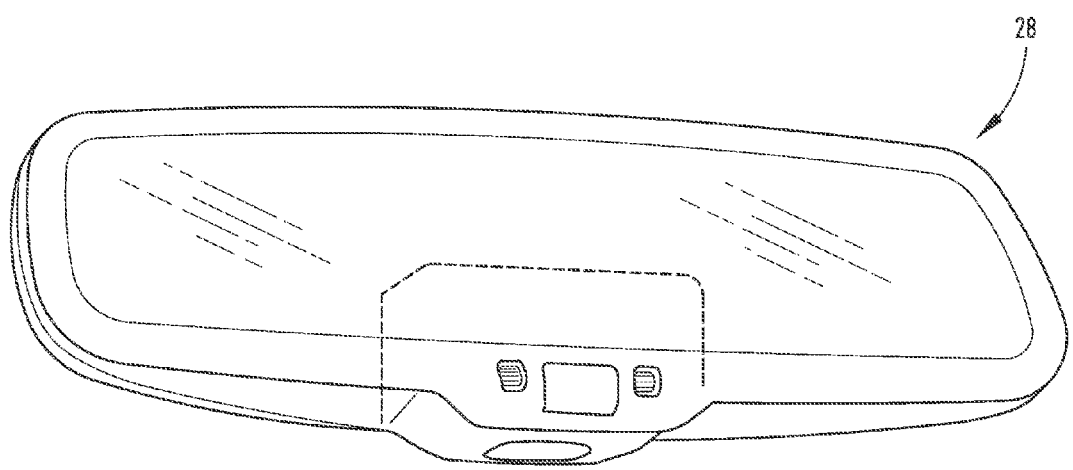
FIG. 1B is a bottom perspective view of a rearview device that can be mounted to a windshield using the rearview device mounting assembly of the present invention.

For purposes of description herein, the terms "upper," "lower," "right," "left," "rear," "front," "vertical," "horizontal," "clockwise," "counter-clockwise," "interior," "exterior" and derivatives thereof shall relate to the invention as oriented in FIG. 1 and as viewed by an occupant of the vehicle. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIGS. 1A-2B, the reference numeral 10 generally designates a rearview device mounting assembly for use in a vehicle 9. The rearview device mounting assembly 10 includes a bracket 12 having a windshield engagement surface 14, a mount abutment surface 16, an internal clip engagement wall 18, and an external peripheral wall 20. A spring clip 22 is operably coupled with a rearview device mount 24 and includes a plurality of legs 26 adapted for engagement with the internal clip engagement wall 18 of the rearview device mounting assembly 10.

As illustrated in the embodiment of FIG. 1A-2B, a rearview device 28 having a housing is configured for use with the rearview device mounting assembly 10, which is adapted to be mounted to the inside surface of a conventional automotive windshield 30. It is contemplated that the rearview device mounting assembly 10 may connect directly or indirectly with the rearview device 28 or with a housing, internal or external, that supports the rearview device 28. The windshield 30 is depicted at a conventional slant to the horizontal, and it will be understood that the rearview device 28 is generally mounted on the inner surface thereof, usually in about the transverse center of the windshield 30, forward of the occupants of the front seat. The bracket 12, commonly known in the industry as a "button," can be permanently adhered to the inner surface of the windshield by means of a conventionally known metal to glass adhesive, such as polyvinyl butyryl, also known as PVB. The rearview device mount 24, sometimes also known as a "channel mount" or "die cast piece" is received over the bracket 12 and adjustably supports the rearview device 28 in cantilevered fashion such that it projects into the vehicle passenger compartment for use by the vehicle driver. The rearview device mounting assembly 10 of the present invention may be used with a variety of mounts which are configured for engagement with a variety of rearview devices 28 including prism-type mirrors, electrochromic mirrors, and camera displays. A mounting plate 32 is disposed between the mount 24 and the spring clip 22.

Referring to the embodiment of FIGS. 3A-3E, the illustrated bracket 12 is a generally elongated member that can be formed from sintered stainless steel or glass-filled nylon, although other materials could also be used. The bracket 12 comprises a generally circular main body portion 40 generally defining an interior aperture 42. The external peripheral wall 20 and the internal clip engagement wall 18 are disposed on the circular main body portion 40. The interior aperture 42 of the bracket 12 is bounded by the internal clip engagement wall 18. The windshield engagement surface 14 extends across a top portion of the bracket 12 substantially orthogonal to the external peripheral wall 20 and the internal clip engagement wall 18. The mount abutment surface 16 extends across a bottom portion of the bracket 12 substantially orthogonal to the external peripheral wall 20 and the internal clip engagement wall 18. It is contemplated that the windshield engagement surface 14 can be substantially planar or have a large radius. The windshield engagement surface is generally configured for adhering to the inside surface of the glass windshield 30 (FIG. 1).

The bracket 12 further includes a top wall 44, as well as first and second side walls 46, 48 that generally define a channel 49, which extends from the main body portion 40. The two side walls 46, 48 of the channel 49 are connected at a distal end thereof by a bridge member 50. The bridge member 50 includes an inclined surface 52 that extends away from the channel 49 defining a ramp 54. A vertical wall 56 is located adjacent to the inclined surface 52, thereby defining a stop groove 58 on the bridge member 50. The purpose of the ramp 54 and stop groove 58 will be described in greater detail herein.

Referring again to FIGS. 3A and 3B, the internal clip engagement wall 18 of the bracket 12 comprises a plurality of spaced retention surfaces 60 that protrude into the interior aperture 42. The retention surfaces 60 are generally positioned along the intersection of the internal clip engagement wall 18 and the mount abutment surface 16. Further, the retention surface 60 is in the form of a simple tab or lip, the length of which extends only a short distance along the internal clip engagement wall 18 around the perimeter of the interior aperture 42. The retention surfaces 60 are spaced apart and discontinuous from one another. At least a portion of the space between adjacent retention surfaces 60 defines an insertion slot 62. When viewing the bracket 12 from the bottom, one insertion slot 62 is located adjacent each retention surface 60, in a counter-clockwise direction therefrom. In the illustrated example, four retention surfaces 60 and four insertion slots 62 are shown, and are positioned approximately diametrically opposite one another on the internal clip engagement wall 18. It is contemplated that more or fewer uniformly and/or non-uniformly spaced retention surfaces 60 and insertion slots 62 can be provided based on the intended use.

As illustrated in FIGS. 3A-3D, the mount abutment surface 16 of the bracket 12 is not planar, but includes a plurality of raised surfaces. Two raised surfaces, referred to as a first platform 70 and a second platform 72, are positioned on the mount abutment surface 16, adjacent to two of the retention surfaces 60. The first platform 70 comprises a first ramp 74 that transitions from a base surface 76 to the first platform 70, and an angled first stop 78 that transitions back down to the base surface 76. The second platform 72 comprises an angled second stop 80 that transitions from the base surface 76 up to the second platform 72.

A second pair of raised surfaces, referred to as a third platform 90 and a fourth platform 92, are also positioned on the mount abutment surface 16, juxtaposed the remaining two retention surfaces 60. The third platform 90 comprises a third ramp 94 and a detent groove 96, which is located on the third platform 90. Like the first ramp 74 of the first platform 70, the third ramp 94 transitions from the base surface 76 to the third platform 90. The fourth platform 92 is similar to the third platform 90, and comprises a fourth ramp 98 and a detent groove 100 located on the top surface thereof.

Figure 2A:
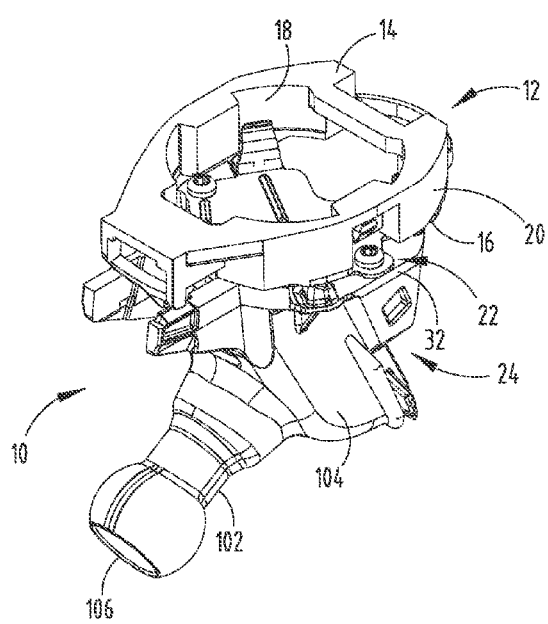
FIG. 2A is a top front perspective view of one embodiment of a rearview device mounting assembly.
Figure 2B:
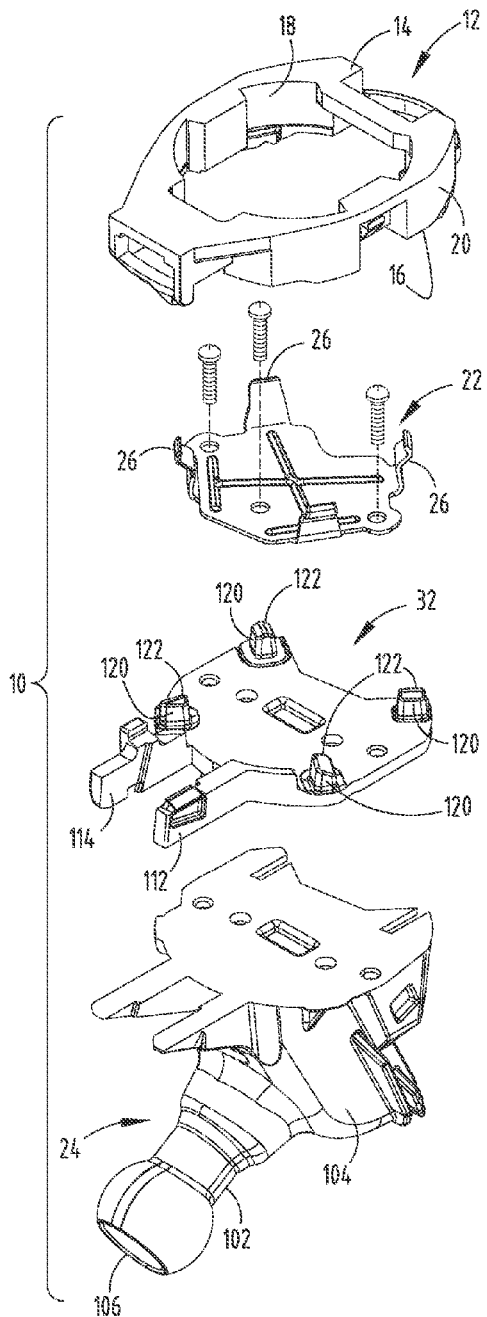
FIG. 2B is a top front exploded perspective view of the rearview device mounting assembly of FIG. 2A.
Figure 4A:
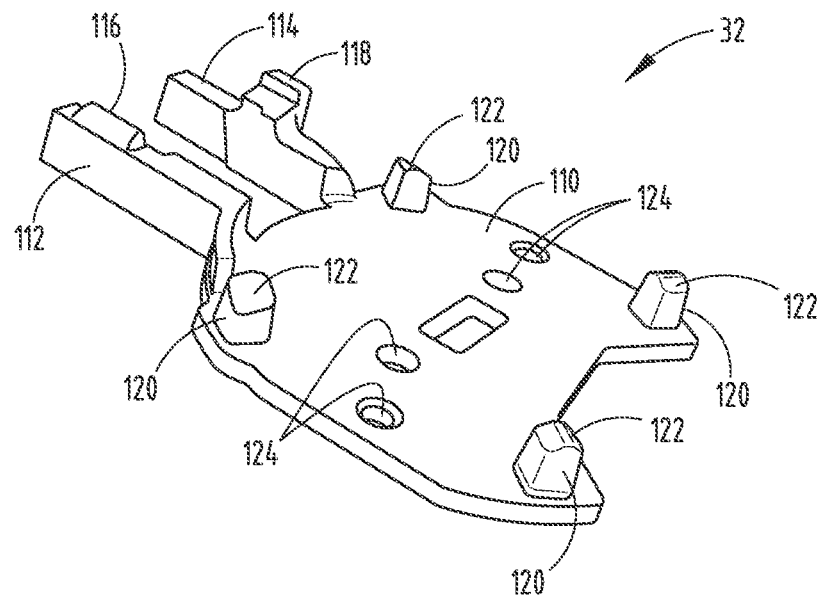
FIG. 4A is a top perspective view of one embodiment of a rearview device mount of the present invention.
Figure 4B:
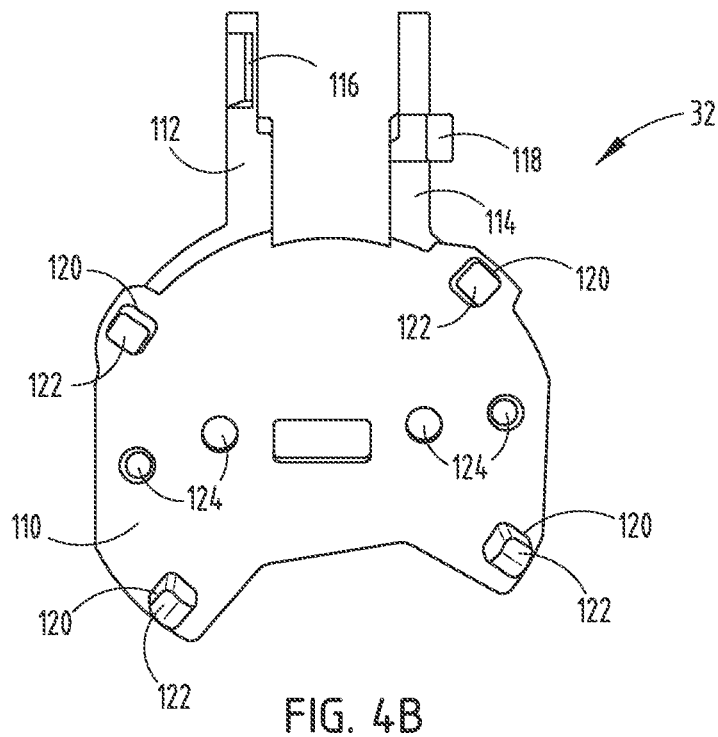
FIG. 4B is a top plan view of the rearview device mount of FIG. 4A.
Figure 6A:
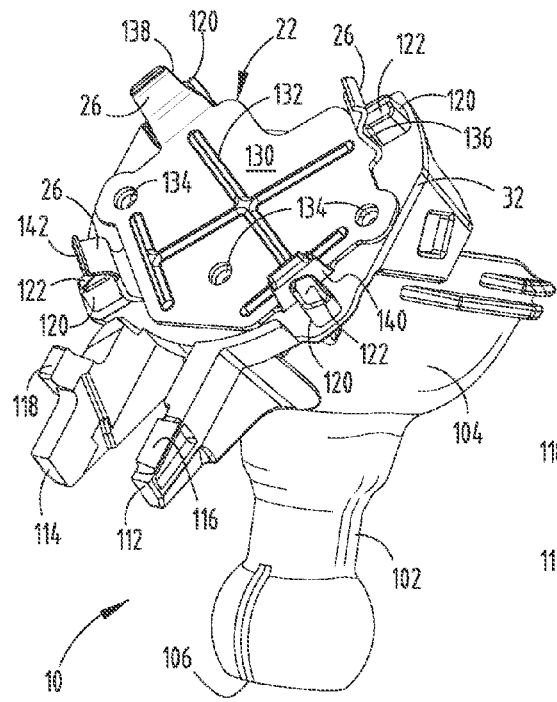
FIG. 6A is a top perspective view of a spring clip on a rearview device mount.
Figure 6B:
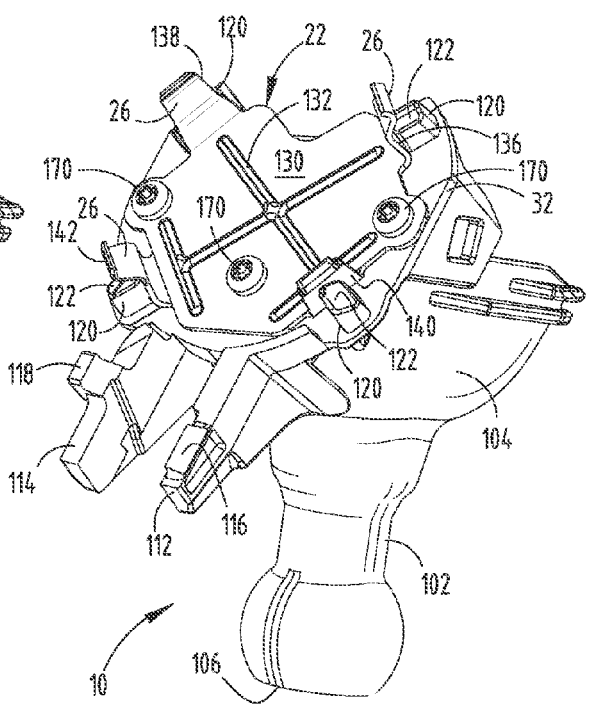
FIG. 6B is a top perspective view of the spring clip of FIG. 6A after attachment to the rearview device mount.
Figure 6C:
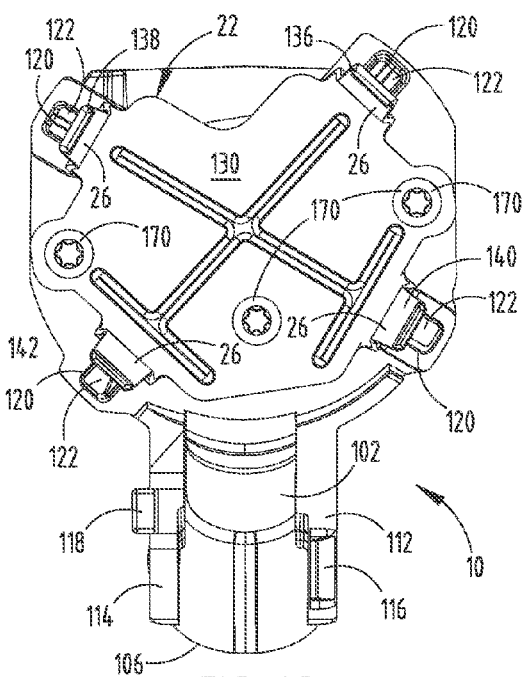
FIG. 6C is a top plan view of the spring clip of FIG. 6A.
Figure 6D:
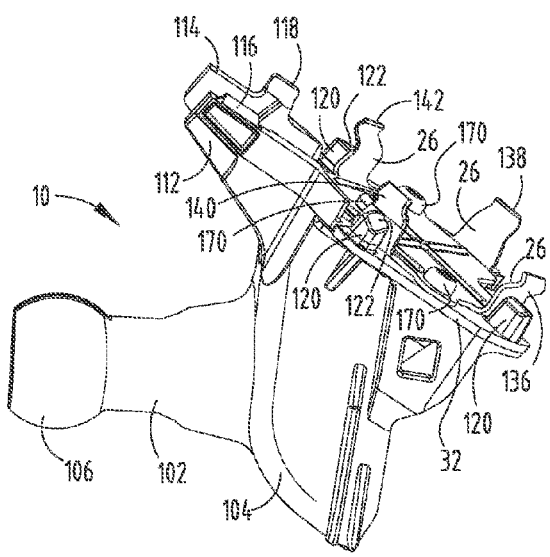
FIG. 6D is a side perspective view of the spring clip of FIG. 6A.

Referring now to FIGS. 2A, 4A, and 4B, the rearview device mount 24 includes an elongate support, commonly referred to as a neck 102, a base 104, the mounting plate 32, and the spring clip 22. The neck 102 includes a ball joint 106 for pivotal engagement with the rearview device 28. The mounting plate 32 is generally a flat one-piece member comprising a main body 110 and a pair of elongate, rectangular arms, a first arm 112, and a second arm 114, extending therefrom. The mounting plate 32 can be mechanically secured to the rearview device mount 24 or be formed integrally therewith. The first arm 112 includes a tab 116, and the second arm 114 includes a stop wall 118. The mounting plate 32 also includes a plurality of standoff nubs 120, a distal end 122 of each standoff nub 120 being angled. The standoff nubs 120 are spaced from one another and generally positioned similarly to the position of the platforms 70, 72, 90, 92 of the bracket 12. Additionally, the mounting plate 32 includes a plurality of through holes 124 configured to receive a mechanical fastener, such as a standard screw. The mounting plate 32 may be affixed to the rearview device mount 24, either permanently or removably, or may be formed integrally with the rearview device mount 24.

Referring now to FIGS. 5A-5D, one embodiment of the spring clip 22 is illustrated. The spring clip 22 can be formed from a single piece of spring steel, which, in one embodiment, includes a thickness of between 0.5 mm and 1.5 mm. The hardness of the steel may fall within a range of 30 to 60 on the Rockwell C scale. The spring clip 22 includes a generally flat base 130 having a plurality of stiffening ribs 132 oriented across the base 130. The stiffening ribs 132 add rigidity to the spring clip 22. The portion of the stiffening ribs 132 that extends parallel with the edge of the spring clip 22 is configured to provide additional rigidity to detach legs 140, 142. The base 130 also includes a plurality of through holes 134 through which a mechanical fastener may pass to affix the spring clip 22 to the mounting plate 32. The plurality of spring biased legs 26 extend from the spring clip 22 and are configured for engagement with the internal clip engagement wall 18 of the bracket 12. More specifically, each of the legs 26 includes a spring-biased engagement portion that abuts the internal clip engagement wall 18 of the bracket 12. It is contemplated that the spring clip can be configured to apply an outward radial force on the internal clip engagement wall 18 of the bracket 12 to secure the rearview device 28 to the bracket 12. In the illustrated example, the spring clip 22 includes first and second pivot legs 136, 138 and first and second detach legs 140, 142, which extend upwardly from the base 130. The first and second pivot legs 136, 138 are disposed generally below and possibly offset from the first and second detach legs 140, 142, after installation the relevance of which will be discussed herein.

As best illustrated in FIGS. 5C and 5D, the profile of each leg 136, 138, 140, 142 has undulated portions including a base portion 150 and an engagement portion 152. The engagement portion 152 includes a first segment 154 and a second segment 156. The transitions between the portions 150, 152 are generally smooth and curved such that the profile of each leg 136, 138, 140, 142 could be described as being S-shaped. The base portion 150 extends from the spring clip base 130 and transitions into the second segment 156. The second segment 156 is substantially straight and is angled outward from a center of the spring clip 22 at an obtuse angle, relative to the base 130. The second segment 156 transitions into the first segment 154, which is angled in toward the center of the spring clip 22 at an obtuse angle, relative to the second segment 156. A bight 160 is disposed between the first segment 154 and the second segment 156. The engagement portion 152 includes an outer chamfered edge 162.

In this example, as illustrated in FIGS. 6A-6D, the spring clip 22 can be affixed to the mounting plate 32 by mechanical fasteners 170, such as a threaded screw. With the spring clip 22 assembled to the rearview device mount 24, the rearview device 28 can be coupled with the bracket 12, which is affixed to the vehicle windshield 30. Installing the rearview device 28 to the bracket 12 is a two-step process. The first step is to insert the pivot legs 136, 138 and detach legs 140, 142 of the spring clip 22 into the insertion slots 62 of the bracket 12, defining a first assembly position. The second step is to rotate the spring clip 22 and mounting plate 32 in the clockwise direction so as to retain the pivot legs 136, 138 and detach legs 140, 142 against the retention surfaces 60 within the bracket 12, thereby defining a final assembly position.

Figure 3A:
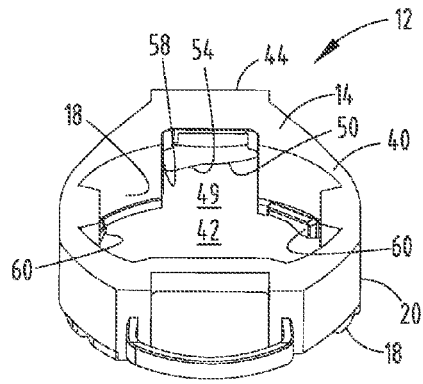
FIG. 3A is a bottom perspective view of one embodiment of a bracket of the present invention.
Figure 3B:
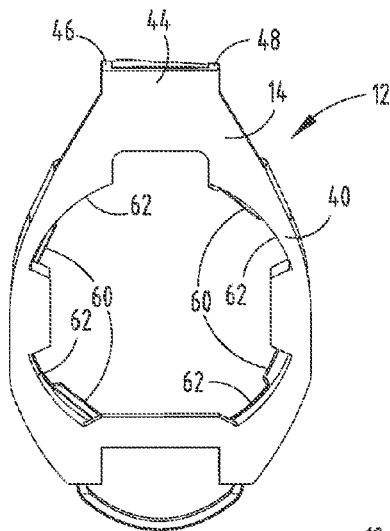
FIG. 3B is a top plan view of the bracket of FIG. 3A.
Figure 3C:
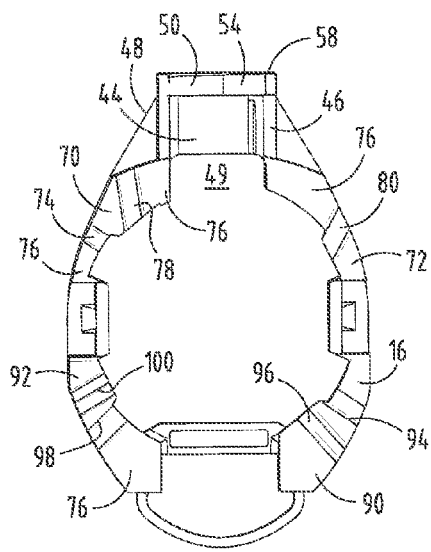
FIG. 3C is a bottom plan view of the bracket of FIG. 3A.
Figure 3D:
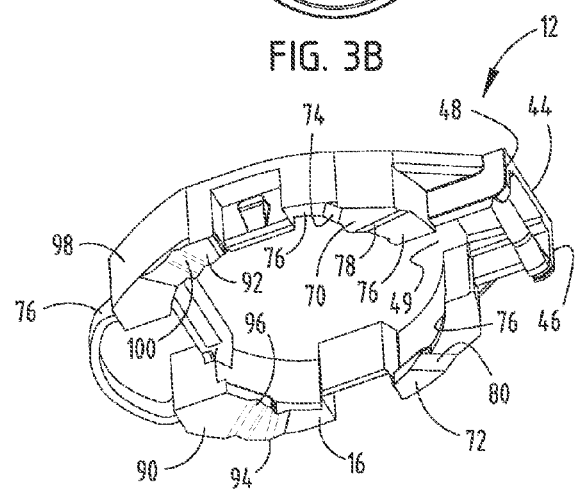
FIG. 3D is a bottom perspective view of the bracket of FIG. 3A.
Figure 3E:
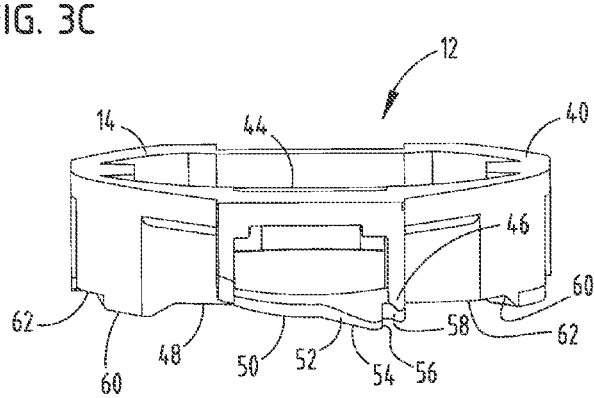
FIG. 3E is a front elevational view of the bracket of FIG. 3A.

Referring now to FIGS. 7A-7D, to begin, the legs 26 of the spring clip 22 are inserted into the corresponding insertion slots 62 of the bracket 12. To insert the spring clip 22 into the bracket 12, the pivot legs 136, 138 and detach legs 140, 142 are deflected at least slightly, although it is also contemplated that the pivot legs 136, 138 and detach legs 140, 142 could be inserted without any deflection. In the first position, the bight 160 of the pivot legs 136, 138 and detach legs 140, 142 engages with the internal clip engagement wall 18. Next, to move the spring clip 22 and rearview device mount 24 to the second position, the spring clip 22 and rearview device mount 24 are rotated in the clockwise direction. During this motion, the standoff nubs 120 of the mounting plate 32 engage the corresponding first, third, and fourth ramps 74, 94, 98 (FIG. 3D). Also, the tab 116 of the first arm 112 of the mounting plate 32 slides along the ramp 54 of the bridge member 50 of the bracket 12. When the spring clip 22 and rearview device mount 24 have been rotated all the way to the final assembly position, the two standoff nubs 120 adjacent the third platform 90 and fourth platform 92 are seated in the detent groove 96, and detent groove 100, respectively, of the third and fourth platforms 90, 92. Additionally, the other two standoff nubs 120 abut the first and second stops 78, 80 of the first and second platforms 70, 72, respectively. Further, the tab 116 on the first arm 112 of the mounting plate 32 is seated in the stop groove 58 on the bridge member 50 of the bracket 12. The interfaces between the standoff nubs 120, the tab 116, the detent grooves 96, 100 and the first and second stops 78, 80 function as a positive stop of the rearview device mounting assembly 10. Additionally, the stop wall 118 on the second arm 114 of the mounting plate 32 abuts the side wall 48 of the bracket 12, preventing over-rotation of the spring clip 22 and rearview device mount 24. The standoff nubs 120 also serve to prevent the spring clip 22 from being over-inserted into the bracket 12.

Figure 8A:
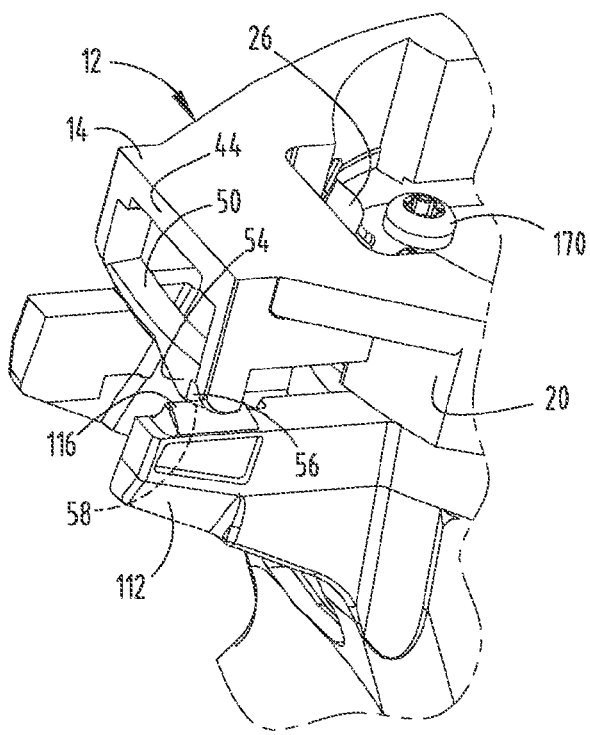
FIG. 8A is an enlarged top perspective view of the detent groove of the bracket of FIG. 7A.
Figure 8B:
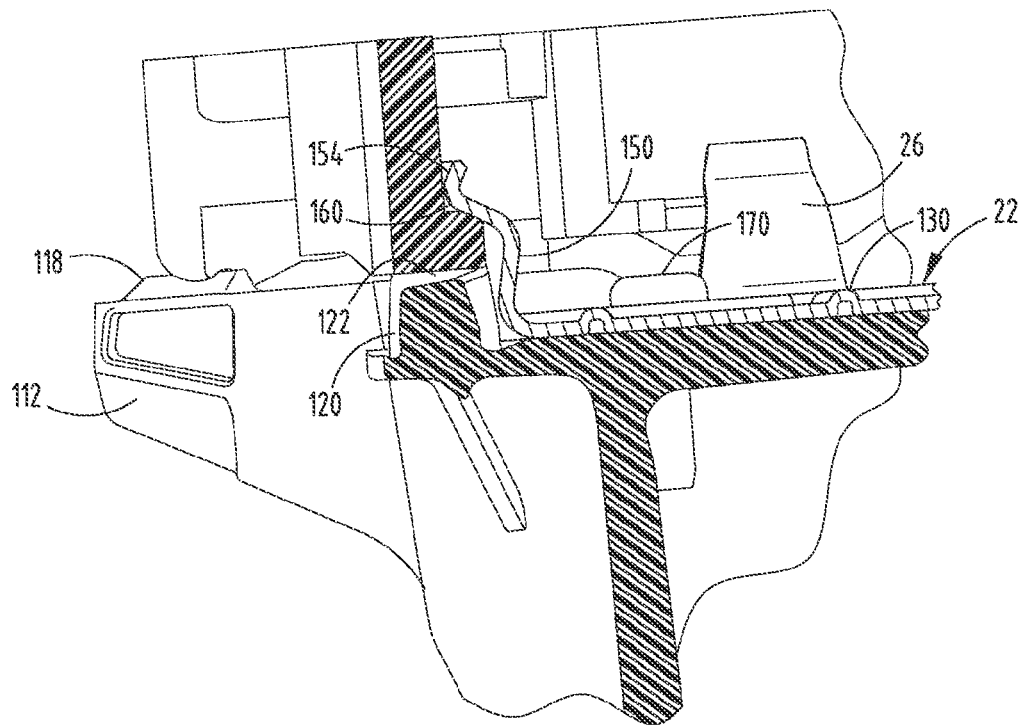
FIG. 8B is a side elevational cross-sectional view illustrating a leg of the spring clip engaged with a retention surface of the bracket.
Figure 9E:
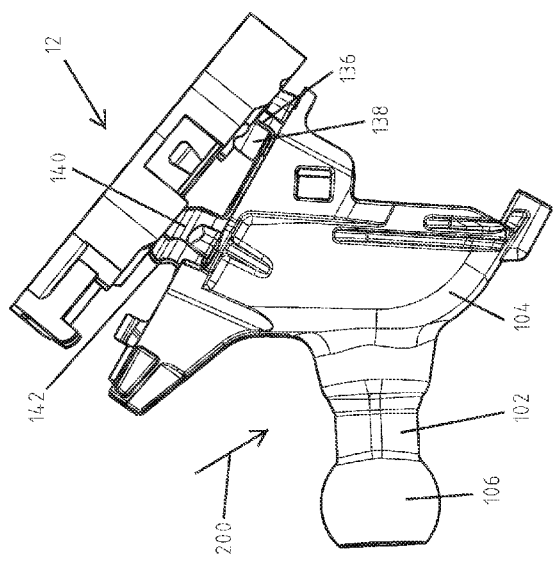
FIG. 9E is a side elevational view of a rearview device mounting assembly of FIG. 9D, illustrating detach legs of the spring clip disengaging a retention surface of the bracket at the beginning of a collision event.
Figure 9F:
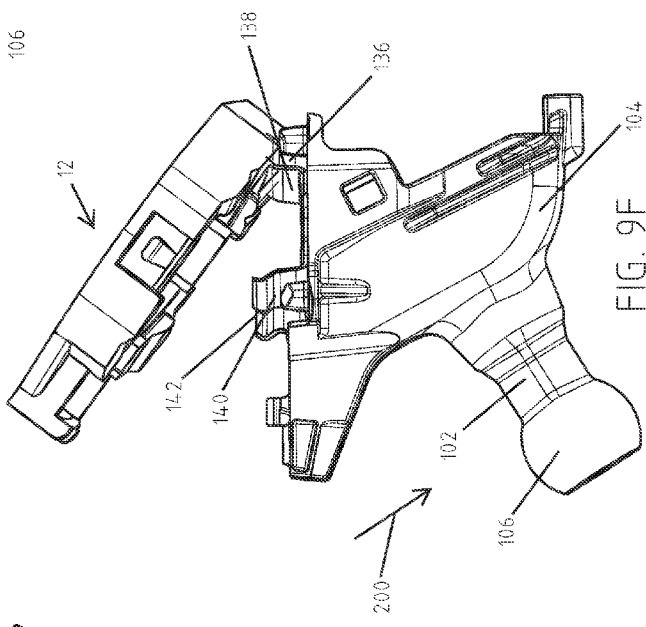
FIG. 9F is a side elevational view of a rearview device mounting assembly of FIG. 9D, illustrating detach legs of the spring clip disengaged from a retention surface of the bracket and a rearview device mounting assembly pivoting about pivot legs of the spring clip during a collision event.
Figure 9D:
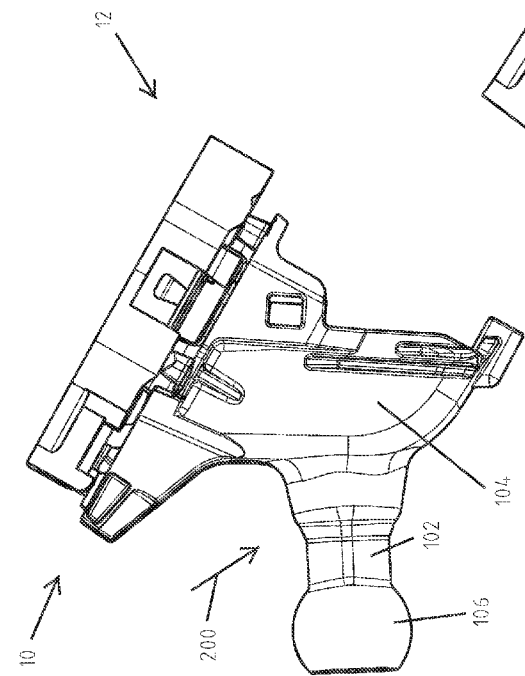
FIG. 9D is a side elevational view of a rearview device mounting assembly before a collision event.

As shown in FIGS. 8A and 8B, in the final assembly, the spring clip 22 is retained within the bracket 12. Specifically, the second segment 156 of each of the detach legs 136, 138 and pivot legs 140, 142 is retained by the retention surface 60 of the bracket 12. The second segment 156 of each leg 136, 138, 140, 142 is rotated under one retention surface 60 when the spring clip 22 is rotated to the final assembly position. Together, the interface between the bight 160 and the internal clip engagement wall 18, as well as the second segment 156 and the retention surface 60 engage to keep the spring clip 22 releasably retained within the bracket 12.

Referring now to FIGS. 9A-9F during a collision event, forces associated with the body of a driver or vehicle occupant may engage the rearview device 28, and consequently, the rearview device mount 24. Application of force F in a direction substantially aligned with the longitudinal axis of the neck 102 are transferred through the base 104 and the mounting plate 32 to the spring clip 22 and ultimately the bracket 12, which is fixedly secured with the windshield 30 (FIG. 1). As the force F moves through the rearview device mounting assembly 10, the rearview device mount 24 and the spring clip 22 begin to rotate in the direction of arrow 200 out of engagement with the bracket 12. More specifically, the force F, which is directed along a path tangential to the pivot legs 136, 138 and detach legs 140, 142, causes the detach legs 140, 142 to force against the retention surfaces 60 and begin withdrawing therefrom. At the same time, the rearview device mount 24 begins to rotate about the pivot legs 136, 138 at a bottom portion of the bracket 12.

Figure 11:
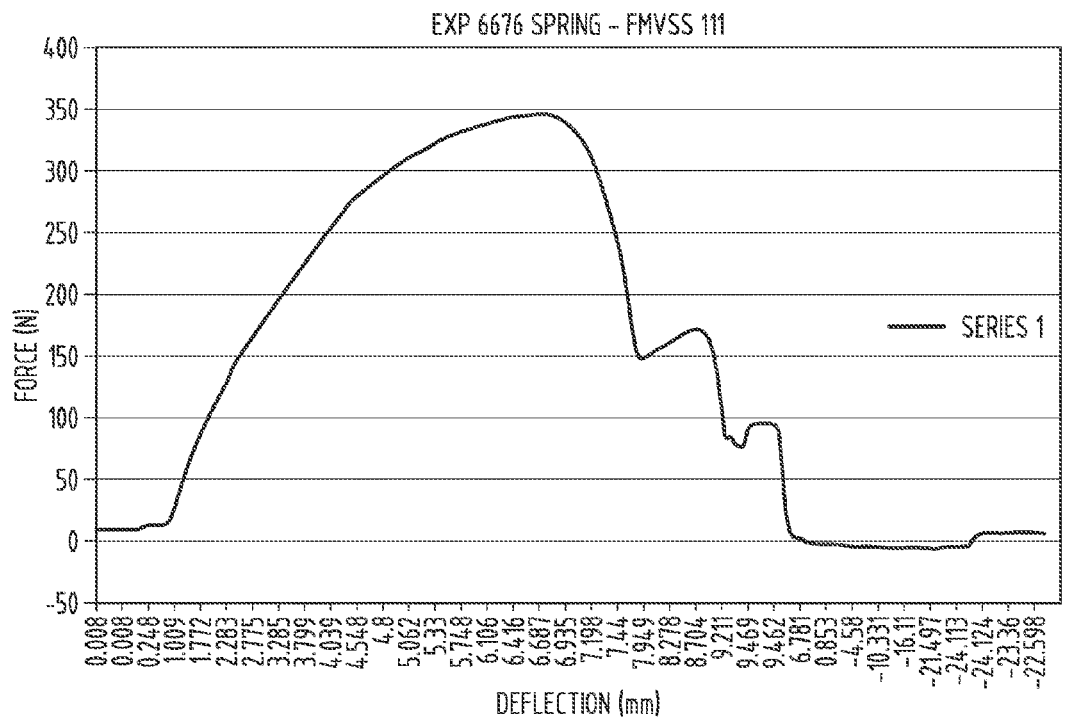
FIG. 11 is an exemplary force vs. deflection curve of one embodiment of a rearview device mounting assembly of the present invention.
Figure 13:
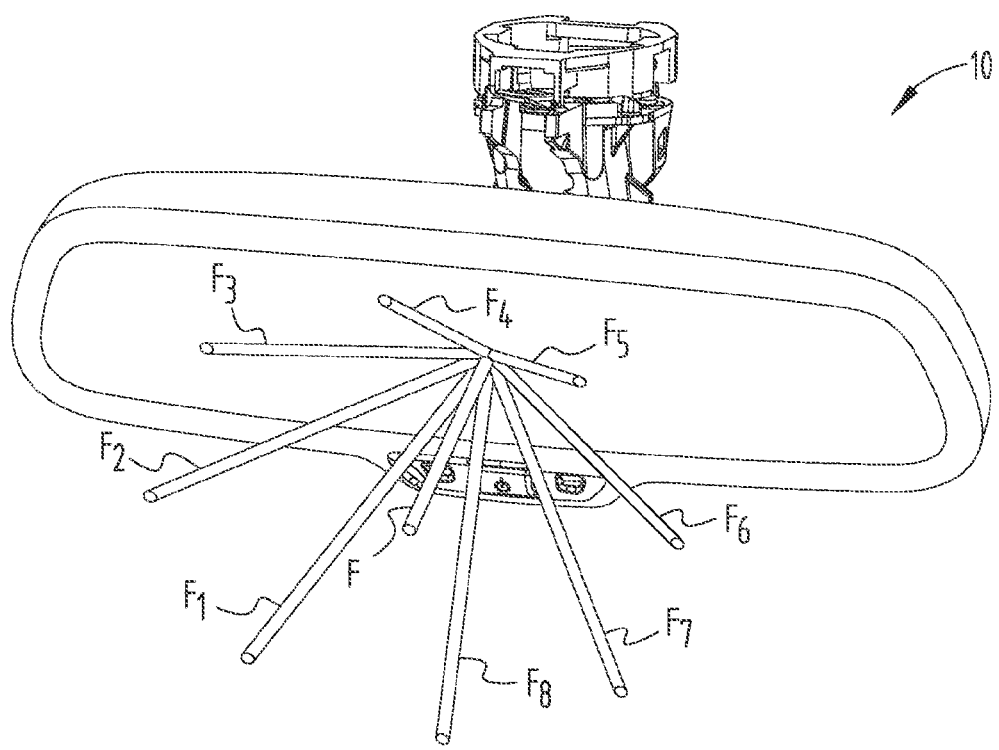
FIG. 13 is a top perspective view of one embodiment of a rearview device mounting assembly with a multitude of contact forces illustrated.
Figure 14:
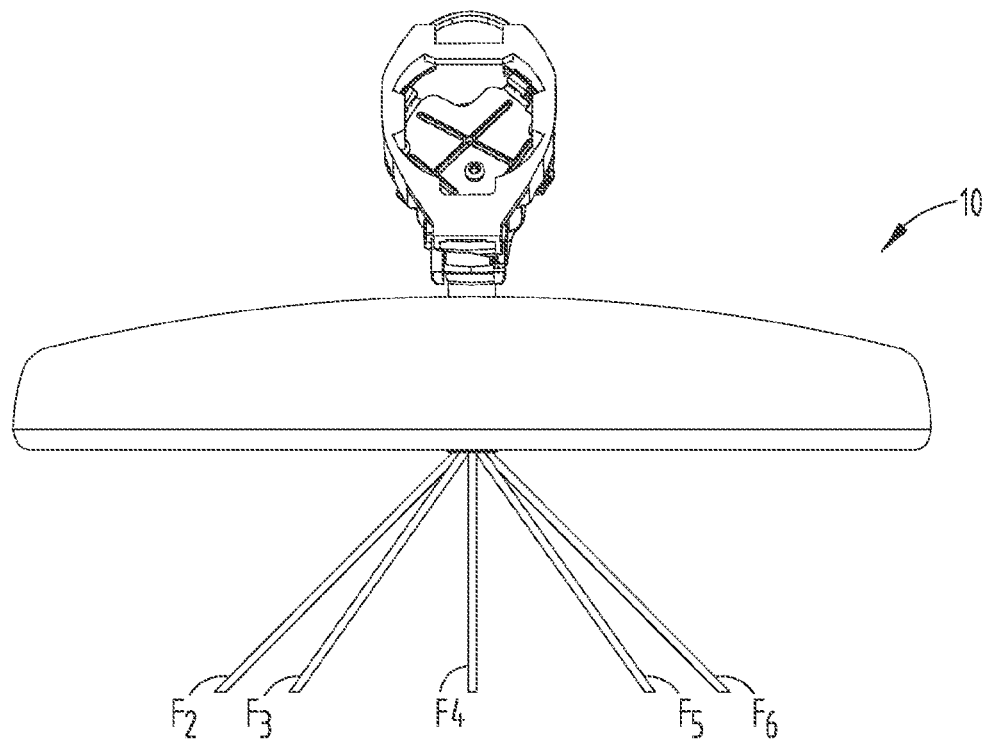
FIG. 14 is a top plan view of the rearview device mounting assembly of FIG. 13.

As the force F approaches 350 Newtons, the detach legs 140, 142 become disengaged from the bracket 12 entirely, causing the spring clip 22 to lose secure engagement with the bracket 12, which results in the rearview device 28 no longer being positioned on the interior surface of the windshield 30. As shown in FIG. 11, increasing the application of force F to the rearview device mounting assembly 10 causes a nearly parabolic increase in deflection until the entire rearview device mounting assembly 10 has deflected approximately 6 mm (approximately 350 Newtons). The steady increase in deflection occurs while the spring clip 22 is rotating about the pivot legs 136, 138 and the detach legs 140, 142 are withdrawing from secure engagement with the retention surfaces 60 on the bracket 12. It will be appreciated that the force F may be applied at a variety of angles that are 45 degrees or greater from the surface of the rearview device 28. As shown in FIGS. 13 and 14, the forces may be applied at angle F, $F_1$, $F_2$, $F_3$, $F_4$, $F_5$, $F_6$, $F_7$, or $F_8$ and the spring clip 22 will detach from the bracket 12 by pivoting about the pivot legs 136, 138. This downward pivotal rotation occurs even when a force is directed at the rearview device 28 in a generally upward direction. These forces are typically associated with head form testing, as defined in the U.S. Department of Transportation Laboratory Test Procedure for FMVSS 111—Rearview Mirrors.

Figure 12:
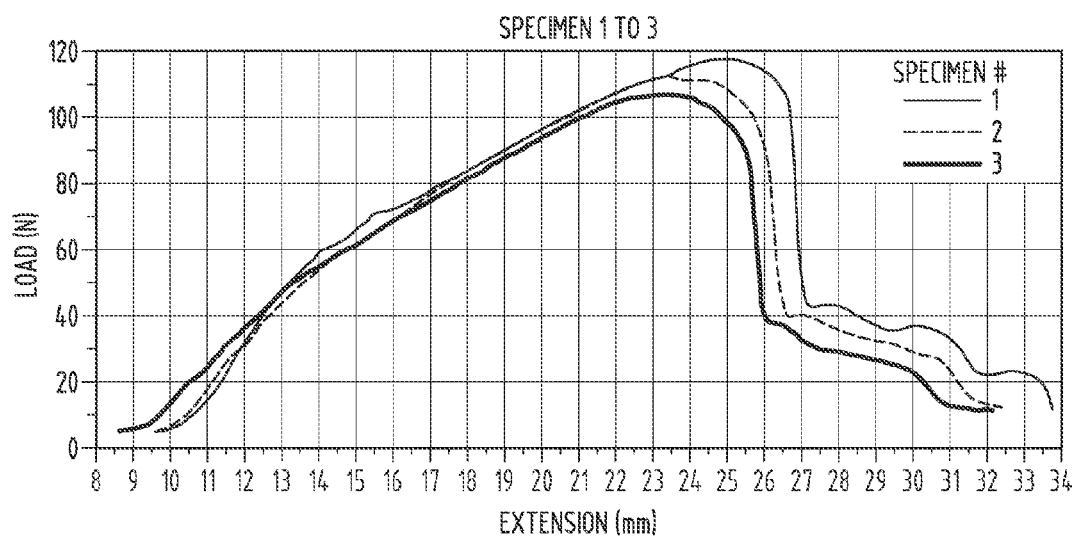
FIG. 12 is an exemplary force vs. extension curve of one embodiment of a rearview device mounting assembly of the present invention.

Referring now to FIG. 12, the "pulldown force," or the retention force sensed by a user when grasping the rearview device 28, prior to adjustment, is approximately 80-150 Newtons. This value is generally associated with the user's impression of how secure the connection is between the rearview device 28 and the windshield 30. Accordingly, the ratio of the pull down force to the head form test force (FIG. 11) is approximately 1:4.4 to 1:2.3.

It will be appreciated that although the external peripheral wall 20, as illustrated, is generally smooth, the external peripheral wall 20 of the bracket 12 can include various ribs, snaps, and other attachment surfaces to which a variety of other supplemental components for use in the vehicle 9 could be affixed. For example, a camera device 300 and a shroud 400, illustrated in FIGS. 10B and 10C, could be mounted proximate to or from the external peripheral wall 20 without interfering with the engagement of the rearview device mounting assembly 10 to the windshield 30 or with the use of other devices, such as a rain sensor 500 illustrated.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview device mounting assembly configured for use with a vehicle, comprising:
   a rearview device including a viewing surface;
   a bracket comprising:
   a windshield engagement surface;
   a mount abutment surface;

an internal clip engagement wall, wherein said internal clip engagement wall comprises a plurality of retention surfaces; and
an external peripheral wall;
a spring clip coupled with a rearview device mount and having a plurality of legs adapted for engagement with the internal clip engagement wall;
wherein said spring clip comprises at least two detach legs configured to withdraw from said retention surface when a breakaway force is applied to said rearview device; and
wherein said spring clip comprises at least two pivot legs, wherein said rearview device pivots about said at least two pivot legs when the breakaway force is applied to said rearview device.

2. The rearview device mounting assembly of claim 1, wherein each of the plurality of legs includes a spring-biased engagement portion.

3. The rearview device mounting assembly of claim 2, wherein each spring-biased engagement portion includes a first segment that engages the internal clip engagement wall and a second segment that engages a corresponding retention surface.

4. The rearview device mounting assembly of claim 1, wherein the internal clip engagement wall includes a plurality of retention surfaces configured to engage an outside surface of each leg of the spring clip.

5. The rearview device mounting assembly of claim 4, wherein the bracket includes an insertion slot adjacent to each of the plurality of retention surfaces.

6. The rearview device mounting assembly of claim 1, wherein the two pivot legs are disposed below the two detach legs after engagement with the bracket.

7. The rearview device mounting assembly of claim 1, wherein the rearview device mount includes an elongate support, and wherein application of force in a direction generally aligned with a central longitudinal axis of the elongate support rotates the spring clip about the pivot legs.

8. The rearview device mounting assembly of claim 1, wherein said spring clip further comprises a generally flat base and at least two stiffening ribs oriented across said generally flat base that extend parallel to said at least two detach legs, said at least two stiffening ribs are configured to provide additional rigidity to said at least two detach legs.

9. The rearview device mounting assembly of claim 1, wherein application of a force applied at approximately 45 degrees or greater from said viewing surface of said rearview device results in detachment of said detach legs and rotation of said rearview device about said pivot legs.

10. A rearview device mounting assembly for a vehicle, comprising:
a rearview device including a viewing surface;
a device housing supporting the rearview device;
a mount pivotally coupled with the device housing; and
a spring clip coupled with the mount and including a plurality of legs configured to engage a bracket including an internal clip engagement wall, the plurality of legs coupling the bracket to the mount, said plurality of legs including a set of pivot legs disposed below a set of detach legs after engagement with said bracket, wherein application of force to said device housing results in detachment of said detach legs and rotation of said device housing about said pivot legs.

11. The rearview device mounting assembly of claim 10, wherein the internal clip engagement wall includes a plurality of retention surfaces configured to engage an outside surface of each leg of the spring clip.

12. The rearview device mounting assembly of claim 10, wherein each of the plurality of legs includes a spring-biased engagement portion.

13. The rearview device mounting assembly of claim 12, wherein each engagement portion includes a first segment that engages the internal clip engagement wall and a second segment that engages a a plurality of retention surfaces.

14. The rearview device mounting assembly of claim 11, wherein the plurality of retention surfaces and the internal clip engagement wall simultaneously engage the plurality of legs.

15. The rearview device mounting assembly of claim 11, wherein the bracket includes an insertion slot adjacent to each of the plurality of retention surfaces.

16. The rearview device mounting assembly of claim 10, wherein the mount includes an elongate support, and wherein application of force in a direction generally aligned with a central longitudinal axis of the elongate support rotates the spring clip about the pivot legs.

17. The rearview device mounting assembly of claim 10, further comprising:
an external peripheral wall on the bracket that includes attachment surfaces adapted to support supplemental components.

18. The rearview device mounting assembly of claim 10, wherein said spring clip further comprises a generally flat base and at least two stiffening ribs oriented across said generally flat base that extend parallel to said set of detach legs, said at least two stiffening ribs are configured to provide additional rigidity to said set of detach legs.

19. The rearview device mounting assembly of claim 10, wherein application of a force applied at approximately 45 degrees or greater from said viewing surface of said rearview device results in detachment of said detach legs and rotation of said device housing about said pivot legs.

20. A rearview device mounting assembly comprising:
a rearview device including a viewing surface;
a device housing pivotally coupled with a mount;
a spring clip coupled with the mount and including a plurality of legs;
a bracket including an internal clip engagement wall and a plurality of retention surfaces configured to engage the plurality of legs, thereby coupling the bracket to the mount;
wherein said spring clip further comprises:
at least two detach legs;
at least two pivot legs;
a generally flat base; and
at least two stiffening ribs oriented across said generally flat base that extend parallel to said at least two detach legs, said at least two stiffening ribs providing additional rigidity to said at least two detach legs.

21. The rearview device mounting assembly of claim 20, wherein the two pivot legs are disposed below the two detach legs after engagement with the bracket.

22. The rearview device mounting assembly of claim 20, wherein the mount includes an elongate support, and wherein application of force in a direction generally aligned with a central longitudinal axis of the elongate support rotates the spring clip about the pivot legs.

23. The rearview device mounting assembly of claim 20, wherein application of a force applied at approximately 45 degrees or greater from said viewing surface of said rearview device results in detachment of said detach legs and rotation of said device housing about said pivot legs.

24. A rearview device mounting assembly for a vehicle, comprising:

a rearview device including a viewing surface;
a rearview device housing supporting the rearview device;
a bracket including an internal clip engagement wall; and
a spring clip coupled with the rearview device housing and including a plurality of legs that apply an outward radial force on the internal clip engagement wall of the bracket to secure the rearview device housing to the bracket, said plurality of legs including a set of pivot legs disposed below a set of detach legs, wherein application of a force applied at approximately 45 degrees or greater from said viewing surface of said rearview device results in detachment of said detach legs and rotation of said device housing about said pivot legs.

25. The rearview device mounting assembly of claim 24, wherein said spring clip further comprises a generally flat base and at least two stiffening ribs oriented across said generally flat base that extend parallel to said set of detach legs, said at least two stiffening ribs are configured to provide additional rigidity to said set of detach legs.

* * * * *